Aug. 19, 1930.   J. W. PEPPER   1,773,467
DIRIGIBLE HEADLIGHT
Filed Nov. 1, 1928    3 Sheets-Sheet 3
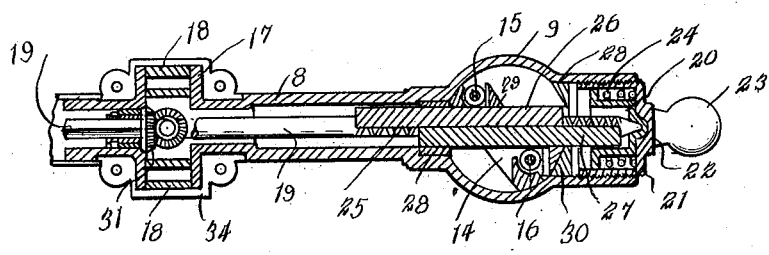
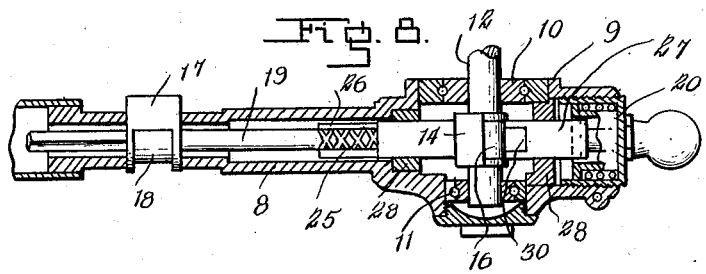
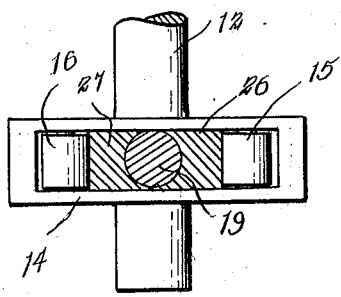
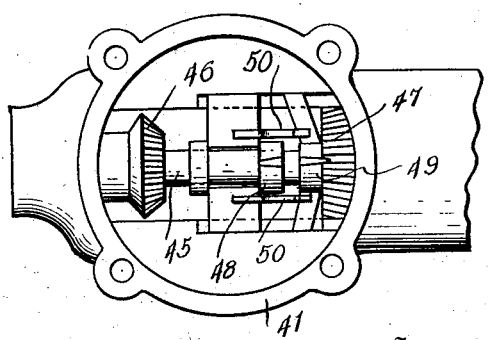
Inventor
J. W. Pepper
By Lacey & Lacey, Attorneys Patented Aug. 19, 1930

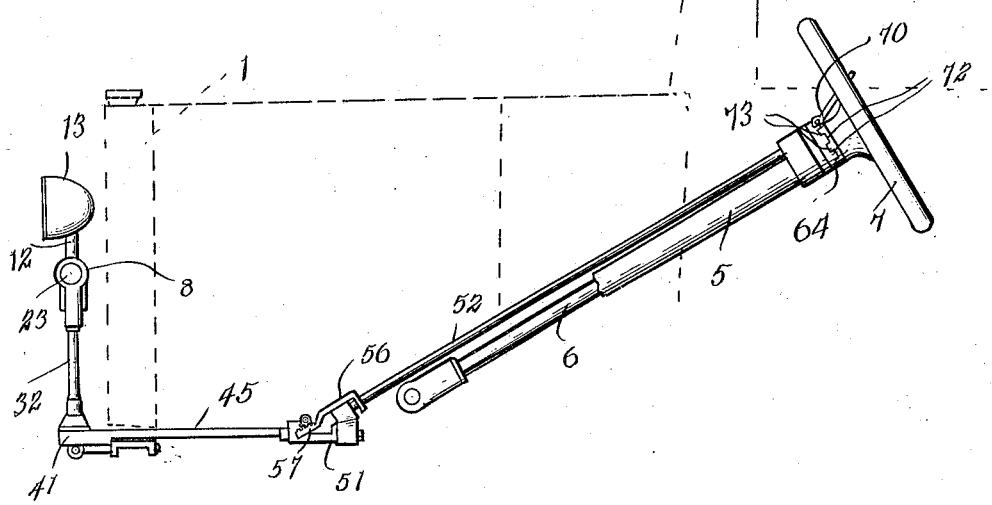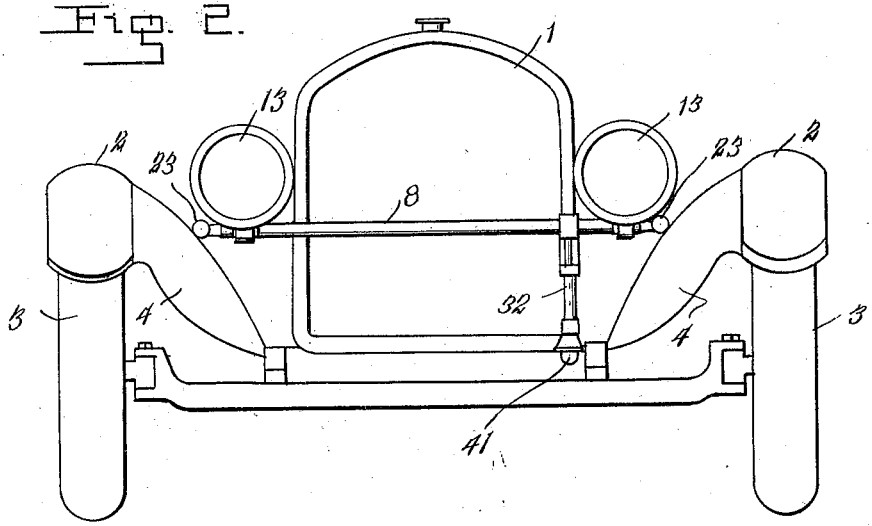

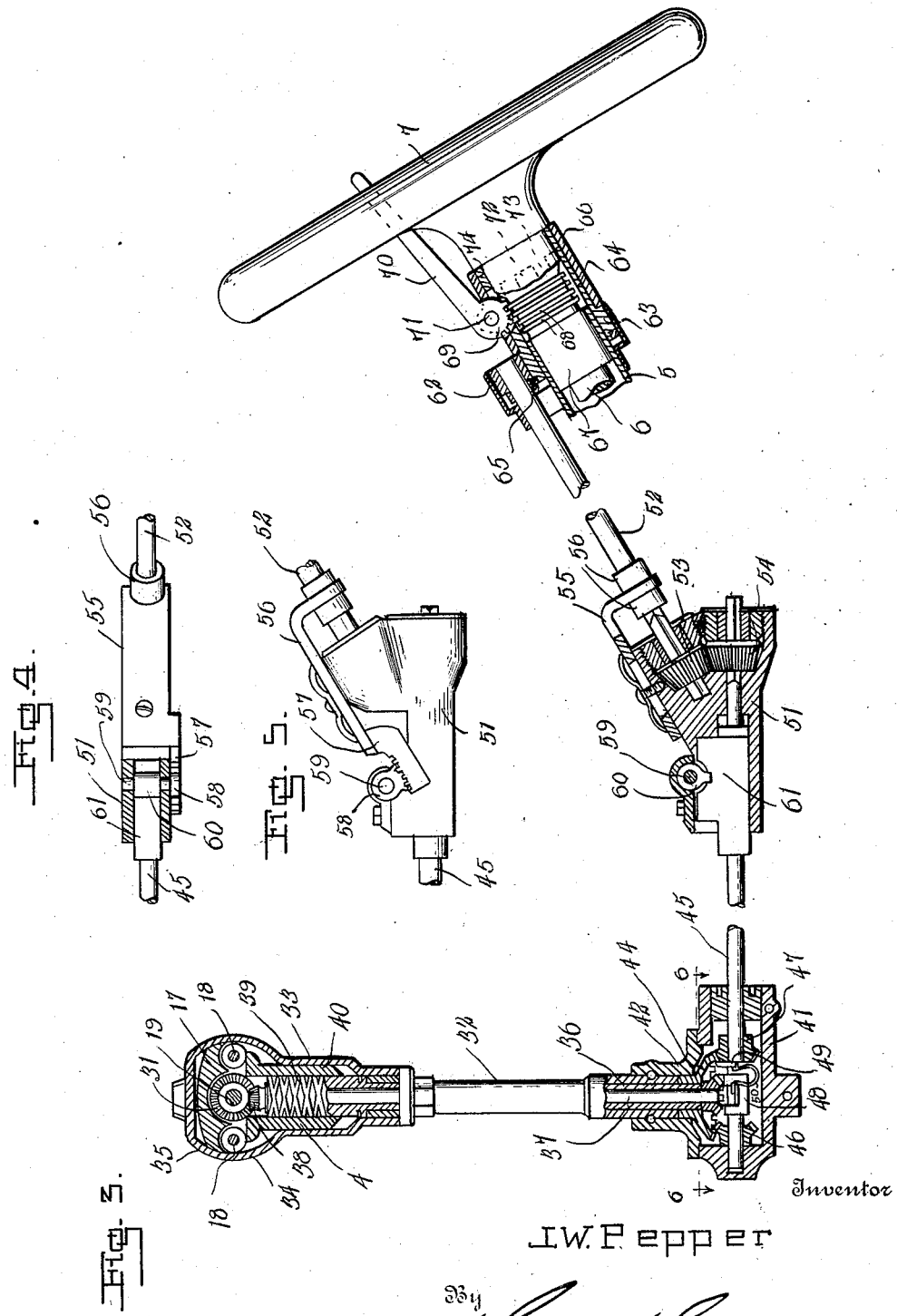

1,773,467

UNITED STATES PATENT OFFICE

JOHN WILLIAM PEPPER, OF BROWNSVILLE, ONTARIO, CANADA

DIRIGIBLE HEADLIGHT

Application filed November 1, 1928. Serial No. 316,426.

This invention relates to headlights for automobiles and more particularly relates to a headlight of that class known as dirigible headlights.

One object of the invention is to provide an automobile with headlights which may be swung horizontally when a turn is being made so that the light will be directed in the direction in which the automobile is turning and also to allow the headlights to be swung toward the right or left independent of the front wheels of the automobile and thereby allow the driver of an automobile to turn the headlights toward the right or left when standing still or while driving along a road. It often happens that the driver of an automobile will desire to observe conditions at a side of a road but cannot do so as the lights are directed straight ahead but by allowing the headlights to be swung independent of the front wheels this can be accomplished.

Another object of the invention is to allow the headlights to be tilted in a vertical direction so that the headlights may be directed upon a signboard mounted in an elevated position where it will not be well lighted under normal conditions. This will also permit the driver of an automobile to tilt the headlights downwardly in order to prevent them from shining in the eyes of the driver of an approaching automobile while at the same time allow the road in front to be well illuminated.

Another object of the invention is to provide a dirigible headlight having operating means which may be easily shifted from manual control to control by the steering wheel of the automobile without stopping the automobile if the automobile is in motion.

The invention is illustrated in the accompanying drawings, wherein

Figure 1 is a view showing the invention in side elevation and in operative relation to an automobile, a portion of which is indicated by dotted lines;

Fig. 2 is a front elevation showing the invention applied to an automobile;

Fig. 3 is an enlarged view showing the headlight-operating means principally in longitudinal section and partially in elevation;

Fig. 4 is a view showing a fragment of the headlight-operating means in top plan with a portion thereof in longitudinal section;

Fig. 5 is a view showing the device of Fig. 4 in side elevation;

Fig. 6 is a view taken on the line 6—6 of Fig. 3;

Fig. 7 is a longitudinal sectional view taken on the line 7—7 of Fig. 2;

Fig. 8 is a view similar to Fig. 7 but taken at right angles thereto, and

Fig. 9 is an enlarged view of the lower end portion of one of the headlight posts.

The improved dirigible headlight mechanism constituting the subject-matter of this invention is adapted to be applied to an automobile of a conventional construction. This automobile, which is indicated by dotted lines in Fig. 1, includes a radiator 1, mud guards 2 disposed over the front wheels 3 and including the usual aprons 4 and conventional steering means for the wheels 3 including a column 5 through which extends a steering shaft or post 6 carrying a steering wheel 7.

A tubular casing 8 extends horizontally in front of the radiator 1 and adjacent its ends is enlarged to form chambers 9 which are substantially circular in top plan and carry upper and lower bearings 10 and 11 to rotatably mount posts 12 which project upwardly from the casing and carry headlights 13 of a conventional construction. Each post is provided within its chamber 9 with an open frame 14 which projects horizontally from opposite sides of the post and carries rollers 15 and 16 mounted in recesses formed in the end bars of the frame and projecting from one side thereof, as shown in Fig. 7. It will be readily seen that, when the posts are rotated, the headlights carried thereby will be swung horizontally from a position to direct their rays straight ahead of the automobile towards the right or left. An arch 17 is formed in spaced relation to the chamber 9 at one end of the casing for a purpose to be hereinafter set forth, and this arch carries rollers 18 which extend longitudinally of the casing at opposite sides thereof.

A shaft 19 extends longitudinally through the casing and has each end tapered and engaged in a bearing cup 20 disposed within an outer cup 21 which is screwed into the end of the casing and provided with a neck extension 22 terminating in an enlarged head 23 and by rotatably connecting the heads 23 with the aprons 4 of the front mud guards, the shaft may be well supported in front of the radiator but at the same time allowed to freely rotate for a purpose to be hereinafter set forth. A spring 24 is disposed about each inner cup 20 with its outer end bearing against the head of the outer cup and its inner end acting against an outstanding flange of the inner cup. These springs serve to retain the inner cups in proper engagement with the tapered ends of the shaft 19.

Each end portion of the shaft 19 is formed with right and left hand threads, as shown at 25, and against each threaded end portion of the shaft are disposed slide bars 26 and 27 which are provided one with right hand threads and the other with left hand threads meshing with corresponding threads of the shaft. It will thus be seen that, when the shaft is rotated, the slide bars will move longitudinally in opposite directions longitudinally of the casing. These slide bars pass through bearings 28 having rectangular openings formed therein to permit the bars to slide freely but prevent them from having movement about the shaft, and from these bars project arms 29 and 30 which engage respectively with the rollers 15 and 16. From an inspection of Fig. 7, it will be readily understood that, when the shaft 19 is rotated through the medium of a gear meshing with a gear 31 carried by the shaft, the slide bars engaged with the threaded end portions of the shaft will be moved longitudinally and since the companion slide bars move in opposite directions and have their arms contacting with the rollers 15 and 16 one arm will apply pressure against the roller with which it contacts while the other has a tendency to move away from its co-operating roller and, therefore, each post will be rotated and the headlights carried by the posts will be swung in unison from a position to direct their rays of light directly ahead of the automobile towards the right or left according to the direction in which the shaft 19 is rotated.

A column 32 is disposed vertically in front of the radiator and at its upper end is provided with a head 33 terminating in a cup 34 which fits about the lower portion of the casing 8 and together with its removable cap or hood 35 forms an enclosure or housing for the arch 17 of the casing. A hollow shaft 36 is rotatably disposed in the column 32 and through this hollow shaft extends an inner shaft 37 which is rotatable independent of the shaft 36 and at its upper end carries a gear or pinion 38 disposed above the upper end of the hollow shaft and meshing with the gear 31 carried by the shaft 19. It will thus be seen that, when the inner shaft 37 is rotated, rotary motion will be transmitted to the shaft 19 and the headlights swung towards the right or left according to the direction in which the shaft 37 is rotated. The upper end portion of the hollow shaft 36 is enlarged somewhat to form a head and this head, which is indicated by the numeral 39, has right and left hand threads cut therein, as shown in Fig. 3. Blocks 40 are slidably disposed in the head 33 of the column, and these blocks which bear against the rollers 18 are formed one with right hand threads and the other with left hand threads which mesh with respective threads of the head 39 and, therefore, when the hollow shaft is rotated, the blocks will be slid vertically in opposite directions and one will apply pressure against the roller 18 with which it contacts while the other will have a tendency to move away from its cooperating roller. Therefore, pressure will be applied to the arch 17 at its front or rear end according to the direction in which the hollow shaft is rotated and the blocks moved and the casing 8 will be rocked forwardly or rearwardly and since the posts are mounted in the casing the posts and the headlights carried thereby will be tilted either forwardly which will cause the headlights to be swung downwardly or rearwardly which will cause the headlights to be tilted upwardly. It will thus be seen that the headlights may be swung down towards the ground in order to prevent a glaring light from shining in the eyes of the driver of an approaching automobile while at the same time allowing the road to be well illuminated or the headlights may be tilted upwardly to direct their rays or light upon an elevated sign and allow the sign to be easily read. It will be obvious that, when the headlights are swung upwardly, they may be also turned toward the right or left so that, if the sign is at one side of a road, it may be illuminated while the automobile is traveling straight ahead.

A gear housing 41 is secured to the front chassis bar of the automobile in any desired manner, and this gear housing is provided with a cap 42 removably secured in any desired manner and extending upwardly about the lower end portion of the column 32. The shafts 36 and 37 project from the lower end of the column into the gear housing with the lower end of the inner shaft extending downwardly below the hollow shaft and carrying a small pinion 43 encircled by a larger gear or pinion 44 which is fast upon the lower end of the hollow shaft. A driven shaft 45 which extends longitudinally of the automobile has its forward end portion rotatably and slidably received in the gear housing 41. Pinions 46 and 47 which are rigidly secured upon the shaft 45 in such spaced relation to each other longitudinally thereof that, when the shaft is slid longitudinally, the gear 46 may be moved into mesh with the gear 43 or the gear 47 moved into mesh with the gear 44 according to the direction in which the shaft 45 is moved. Latches 48 and 49 are loose upon the shaft 45 between the gears 46 and 47 and provided with spurs to engage the teeth of the gears 43 and 44. These latches are acted upon by a spring 50 which urges them away from each other and normally retains them in position for engagement with the teeth of the gears 43 and 44 to prevent the inner shaft 37 and hollow shaft 36 from rotating. When the shaft 45 is moved longitudinally towards the right in Fig. 3 to engage the gear 46 with the gear 43, the latch 48 will be moved out of latching engagement with the gear 43, while the latch 49 remains in engagement with the teeth of the gear 44 in order to allow the inner shaft 37 to rotate without the shaft 36 turning with it and when the shaft 45 is moved toward the left to the position shown in Fig. 3 the latch 49 will be moved out of engagement with the teeth of the gear 44 to allow the hollow shaft to turn freely while the latch 48 will have engagement with the teeth of the gear 43 to hold the inner shaft 37 stationary. It will thus be seen that there will be no danger of the shafts 36 and 37 rotating together and the headlights will always be swung either longitudinally or vertically according to the wishes of the operator.

The driven shaft 45 extends rearwardly beneath the automobile and its rear end portion is slidably and rotatably received in a bearing 51 which is mounted upon a suitable portion of the chassis in any desired manner and in addition to supporting the rear end of the driven shaft also serves to rotatably and slidably support the lower end of an operating shaft 52 which may be referred to as a drive shaft and extends parallel to the steering column 5 adjacent the forward side thereof. The adjacent ends of the shafts 45 and 52 pass through gears 53 and 54 which are held against rotation thereon so that while the two shafts may have sliding movement longitudinally, rotary motion will be transmitted to the shaft 45 when the drive shaft 52 is rotated. An arm 55 which is engaged with the shaft 52 between collars 56 is slidably connected with the bearing 51, and this arm carries a forwardly extending rack 57, the teeth of which mesh with a pinion 58 fast upon a shaft 59 rotatably mounted in the bearing transversely thereof. This shaft carries a finger 60 which projects downwardly therefrom and is received in a block 61 fast upon the shaft 45 and when the shaft 59 is rotated by sliding the shaft 52 longitudinally the shaft 45 will be slid longitudinally to effect selected engagement of the gears 46 and 47 with their cooperating gears 43 and 44.

The upper end of the shaft 52 carries a pinion 62 which meshes with gear teeth 63 formed about the lower portion of a sleeve 64 slidably and rotatably engaged with the upper end portion of the steering column 5. This sleeve is provided beneath the gear teeth 63 with a ring 65 which engages beneath the gear 62 and above the teeth the sleeve is encased by a collar 66 which overlaps the gear 62. It will thus be seen that, when the sleeve 64 is moved longitudinally, the gear 62 will be moved with it and the shaft 52 slid longitudinally to effect adjustment of the gears 46 and 47 relative to the gears 43 and 44, as has been heretofore set forth. A bushing 67 which constitutes a bearing for the upper end of the steering post 6 is rigidly secured within the upper end of the steering column and this bushing projects upwardly from the steering column within the sleeve 64 and is formed with circumferentially extending ribs or teeth 68 which serve as a rack and are engaged by the teeth formed about the circular head 69 at the forward end of a lever 70. The pivot 71 for the lever extends through the head 69 centrally thereof and is mounted in ears projecting from the collar 66, and it will be readily seen from an inspection of Fig. 3 that, when the lever is swung about its pivot, the sleeve 64 together with the collar 66 will be moved longitudinally. At its upper end the sleeve is formed with clutch teeth 72 for interlocking engagement with clutch teeth 73 formed upon a ring 74 fast about the hub of the steering wheel 7 and by sliding the sleeve longitudinally upon the steering column these clutch teeth may be moved into and out of operative engagement with each other. When the clutch teeth are in engagement with each other, turning of the steering wheel will cause the sleeve 64 to rotate with it and since the gear 62 meshes with the gear teeth 63 of the sleeve the shaft 52 will be rotated and rotary motion transmitted through the shafts 45 and 37 to rotate the shaft 19 to the post 12. It will thus be seen that the headlights will be turned with the front wheels in the direction in which a turn is to be made and the light directed in the path in which an automobile is to travel. By swinging the lever forwardly forty-five degrees, the sleeve may be forced downwardly out of engagement with the teeth of the hub without moving the shafts 52 and 45 forwardly a sufficient distance to release the gear 46 from the gear 43 and the lever can then be used as a handle to rotate the sleeve and, as previously explained, impart rotary motion to the shaft 19. Therefore, the headlights may be manually swung to direct their lights toward one side of the road without turning the steering wheel and a ditch at one side of the road may be illuminated while driving the car straight ahead or the headlights may be turned to illuminate a sign at one side of the road. When the lever is swung forwardly ninety degrees, the gear 46 will be moved out of mesh with the gear 43 and the gear 47 moved into mesh with the gear 44 so that, when the sleeve is rotated through the medium of the lever, the hollow shaft 36 will be rotated and the headlights tilted vertically either towards the ground or to direct their rays upwardly upon an overhead sign. I have, therefore, provided means whereby the headlights of an automobile may be tilted vertically in order to inspect a sign or prevent the driver of an approaching car from being blinded and have further provided means through the medium of which the headlights may be swung horizontally independent of the front wheels of an automobile or the mechanism engaged with the steering wheel so that whenever the steering wheel is turned to guide an automobile toward the right or left the headlights will be swung in the direction in which a turn is to be made.

Having thus described the invention, I claim:

1. In a structure of the character described, a tubular casing to extend horizontally in front of the radiator of an automobile, a hollow vertical column beneath said casing and rotatably supporting the casing, a shaft extending longitudinally in said casing and rotatable therein, posts rotatably supported in said casing and projecting upwardly therefrom to support headlights, each post including an open frame within the casing disposed transversely about said shaft and having vertically disposed rollers at opposite sides of the shaft, slide bars extending through each frame at opposite sides of said shaft and having oppositely threaded engagement with the shaft to move longitudinally in opposite directions when the shaft is rotated, arms projecting from said bars and engaging the rollers of said frame to rotate the posts and swing lamps carried thereby horizontally, means to impart rotary motion to said shaft, and means to rock said casing and tilt said posts forwardly and rearwardly.

2. In a structure of the character described, a tubular casing to extend horizontally in front of the radiator of an automobile, a hollow vertical column beneath said casing and rotatably supporting the casing, a shaft extending longitudinally in said casing and rotatable therein and having a portion formed with oppositely cut threads, a post rotatably supported in said casing and projecting upwardly therefrom to support a headlight, slide bars extending longitudinally of said shaft and having oppositely threaded engagement with its threaded portion to move longitudinally of the shaft in opposite directions when the shaft is rotated, abutments carried by said bars and engaging said post at opposite sides thereof to rotate the post when the bars are moved, means to impart rotary motion to said shaft, and means to rock said casing and tilt the post.

3. In a structure of the character described, a tubular casing to extend horizontally in front of the radiator of an automobile, a hollow vertical column beneath said casing and rotatably supporting the casing, a shaft extending longitudinally in said casing and rotatable therein, posts rotatably supported in said casing and projecting upwardly therefrom to support headlights, means for transmitting rotary motion from said shaft to said posts and cause lamps carried by the posts to swing horizontally, means to rock said casing and tilt the posts forwardly and rearwardly, and means to rotate said shaft.

4. In a structure of the character described, a tubular casing to extend horizontally in front of the radiator of an automobile, a hollow vertical column beneath said casing and rotatably supporting the casing, a shaft extending longitudinally in said casing and rotatable therein, posts rotatably supported in said casing and projecting upwardly therefrom to support headlights, means for transmitting rotary motion from said shaft to said posts and cause lamps carried by the posts to swing horizontally, the casing when rocked causing the posts to tilt forwardly and rearwardly and cause the lamps to be tilted vertically, a hollow shaft in said column rotatable therein and having its upper end portion provided with right and left hand threads, blocks in said column at the front and rear of said hollow shaft and having oppositely threaded engagement therewith, said casing having side extensions engaging the upper ends of said blocks whereby when the hollow shaft is rotated and the blocks moved vertically in opposite directions the casing will be rocked, an inner shaft rotatably received in said hollow shaft and having geared connection with the shaft in said casing, and means to selectively rotate the hollow shaft and inner shaft.

5. In a structure of the character described, a tubular casing to extend horizontally in front of the radiator of an automobile, a hollow vertical column beneath said casing and rotatably supporting the casing, a shaft extending longitudinally in said casing and rotatably therein, posts rotatably supported in said casing and projecting upwardly therefrom to support headlights, means for transmitting rotary motion from said shaft to said posts and cause lamps carried by the posts to swing horizontally, a hollow shaft in said column rotatable therein, means actuated by said hollow shaft to rock said casing when the hollow shaft is rotated and cause the posts to be tilted forwardly and rearwardly, an inner shaft rotatably received in said hollow shaft and having geared connection with the shaft in said casing, a driven shaft slidably and rotatably mounted, gears at the lower ends of the hollow shaft and inner shaft, gears spaced longitudinally upon said driven shaft and selectively moved into mesh with cooperating gears of the hollow shaft and inner shaft by longitudinal adjustment of the driven shaft, a drive shaft rotatably and slidably mounted, means to impart sliding movement from the drive shaft to said driven shaft, and means to transmit rotary motion from the drive shaft to the driven shaft.

6. In a structure of the character described, a tubular casing to extend horizontally in front of the radiator of an automobile, a hollow vertical column beneath said casing and rotatably supporting the casing, a shaft extending longitudinally in said casing and rotatable therein, posts rotatably supported in said casing and projecting upwardly therefrom to support headlights, means for transmitting rotary motion from said shaft to said posts and cause lamps carried by the posts to swing horizontally, a hollow shaft in said column rotatable therein, means actuated by said hollow shaft to rock said casing when the hollow shaft is rotated and cause the posts to be tilted forwardly and rearwardly, an inner shaft rotatably received in said hollow shaft and having geared connection with the shaft in said casing, a driven shaft slidably and rotatably mounted, gears at the lower ends of the hollow shaft and inner shaft, gears spaced longitudinally upon said driven shaft and selectively moved into mesh with cooperating gears of the hollow shaft and inner shaft by longitudinal adjustment of the driven shaft, a drive shaft rotatably and slidably mounted, a bearing having adjacent ends of the drive shaft and driven shaft slidably and rotatably received therein, meshing gears in said bearing slidably receiving the shafts and held against rotation thereon to transmit rotary motion from the drive shaft to the driven shaft, means for transmitting sliding movement from the drive shaft to the driven shaft, and means for rotating and sliding said drive shaft.

7. In a structure of the character described, a tubular casing to extend horizontally in front of the radiator of an automobile, a hollow vertical column beneath said casing and rotatably supporting the casing, a shaft extending longitudinally in said casing and rotatable therein, posts rotatably supported in said casing and projecting upwardly therefrom to support headlights, means for transmitting rotary motion from said shaft to said posts and cause lamps carried by the posts to swing horizontally, the casing when rocked causing the posts to tilt forwardly and rearwardly and cause the lamps to be tilted vertically, a hollow shaft in said column rotatable therein, means actuated by said hollow shaft to rock the casing when the hollow shaft is rotated, an inner shaft rotatably received in said hollow shaft and having geared connection with the shaft in said casing, a driven shaft slidably and rotatably mounted, means to selectively transmit rotary motion from said driven shaft to the hollow shaft and the inner shaft controlled by longitudinal adjustment of the driven shaft, a drive shaft rotatably and slidably mounted, a bearing having adjacent ends of the drive shaft and driven shaft slidably and rotatably received therein, meshing gears in said bearing slidably receiving the shafts and held against rotation thereon, means for transmitting sliding movement from the drive shaft to the driven shaft, a steering column, a steering post in said steering column, a steering wheel carried by said steering post, a sleeve loose upon said steering column and having gear teeth about its lower portion and clutch teeth at its upper end to engage clutch teeth carried by the steering wheel, a gear carried by said drive shaft and meshing with the gear teeth of said sleeve, and means to slide the collar longitudinally into and out of engagement with the clutch teeth of the steering wheel and slide the drive shaft longitudinally, said means constituting a handle for rotating the sleeve when released from the steering wheel.

8. In a structure of the character described, a tubular casing to extend horizontally in front of the radiator of an automobile between the front mud guards thereof, a vertical column beneath said casing, said column being hollow and the casing being rotatably connected with the upper end thereof, a shaft extending axially in said casing and rotatable therein, lamp posts rotatably carried by said casing and extending upwardly therefrom, means for imparting rotary motion from said shaft to said posts whereby headlights carried by the posts may be turned horizontally, shafts rotatably mounted in said column one within the other, the inner shaft having geared connection with the shaft in said casing to impart rotary motion thereto, blocks slidable in said column and bearing against said casing at the front and rear of the column, the outer shaft of said column having connection with said blocks to move the blocks in opposite directions and rotate the casing to tilt the posts, and means for selectively rotating the shafts in said column.

In testimony whereof I affix my signature.

JOHN WILLIAM PEPPER. [L. S.]